(12) United States Patent
Bonacini

(10) Patent No.: US 8,869,864 B2
(45) Date of Patent: Oct. 28, 2014

(54) MACHINE FOR FITTING AND REMOVING WHEEL TIRES FOR VEHICLES

(75) Inventor: Maurizio Bonacini, Correggio (IT)

(73) Assignee: Giuliano Group S.p.A., Correggio (RE) (IT)

( * ) Notice: Subject to any disclaimer, the term of this patent is extended or adjusted under 35 U.S.C. 154(b) by 258 days.

(21) Appl. No.: 13/461,824

(22) Filed: May 2, 2012

(65) Prior Publication Data

US 2012/0291961 A1    Nov. 22, 2012

(30) Foreign Application Priority Data

May 20, 2011    (IT) .............................. MO2011A0119

(51) Int. Cl.
*B60C 25/138*    (2006.01)
*B60C 25/05*    (2006.01)

(52) U.S. Cl.
CPC ........... *B60C 25/0578* (2013.01); *B60C 25/138* (2013.01)
USPC ....................................................... 157/1.24

(58) Field of Classification Search
CPC .... B60C 25/132; B60C 25/138; B60C 25/05; B60C 25/0527
USPC ............................................... 157/1.17, 1.24
See application file for complete search history.

(56) References Cited

U.S. PATENT DOCUMENTS

| | | | | |
|---|---|---|---|---|
| 4,230,170 A | * | 10/1980 | Duquesne | .................... 157/1.24 |
| 4,969,498 A | * | 11/1990 | Sheets | .......................... 157/1.17 |
| 5,325,903 A | * | 7/1994 | du Quesne | .................. 157/1.24 |
| 7,341,090 B2 | | 3/2008 | Gonzaga | |
| 7,703,497 B2 | | 4/2010 | Vignoli | |
| 8,522,851 B2 | * | 9/2013 | du Quesne et al. | .......... 157/1.17 |

FOREIGN PATENT DOCUMENTS

| | | |
|---|---|---|
| DE | 689 03 741 | 6/1993 |
| EP | 1 710 099 | 10/2006 |
| EP | 1 946 946 | 7/2008 |

OTHER PUBLICATIONS

Italian Search Report dated Dec. 22, 2011, corresponding to Italian Priority Application No. MO2011000119.

* cited by examiner

*Primary Examiner* — David B Thomas
(74) *Attorney, Agent, or Firm* — Young & Thompson

(57) ABSTRACT

A machine for fitting and removing wheel tires for vehicles includes a bearing structure, at least an apparatus for fastening and rotating the rim of a wheel for vehicles, a tool-carrier unit associated mobile with the bearing structure and having a removal tool, at least an adjustment apparatus suitable for adjusting the position of the tool-carrier unit with respect to the bearing structure, to place the tool-carrier unit into a work configuration wherein the removal tool is arranged in proximity of the apparatus for fastening and rotating, at least a memorisation device for memorising the position of the tool-carrier unit in the work configuration and at least a positioning device for positioning the tool-carrier unit with respect to the bearing structure between the work configuration and a configuration of minimum overall dimensions, wherein the tool-carrier unit is arranged in proximity of the bearing structure.

16 Claims, 6 Drawing Sheets

MACHINE FOR FITTING AND REMOVING WHEEL TIRES FOR VEHICLES

BACKGROUND OF THE INVENTION

Figure 1:
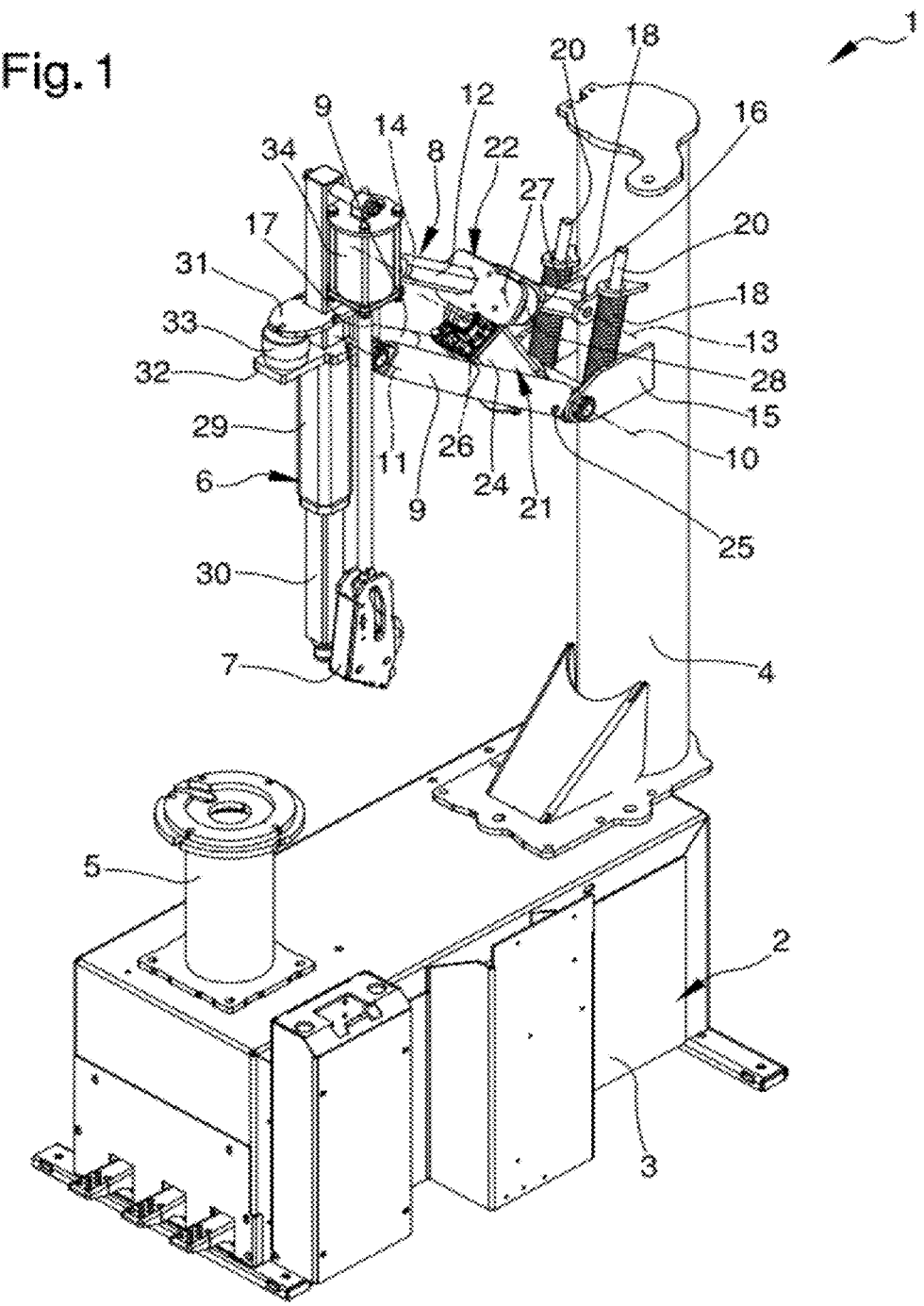

The present invention relates to a machine for fitting and removing wheel tires for vehicles.

DESCRIPTION OF THE RELATED ART

It is known that vehicle wheels generally comprise a metal rim having along the perimeter annular flanges between which are fitted tight up and adhering the terminal portions, so-called "beads" of an elastic tire.

The use is currently known of so-called "tire-changing" machines, suitable for removing tires from and fitting tires on the relevant rim to carry out, e.g., maintenance, repair or replacement jobs.

In particular, different types of tire-changing machines are known of the automatic type which generally comprise a bed having an apparatus for fastening and rotating a wheel, a supporting upright which lifts vertically from the bed, a tool-carrier arm associated with the upright and translatable in terms of height and horizontally, manually or by operation of the respective actuators, and an operating head supported by the tool-carrier arm and having a tool for the removal of the tire.

The removal tool commonly has a curved terminal part and is suitable for gripping the bead of the tire to lift this and remove it above the annular flange of the rim.

During use, following a preliminary phase involving the detachment of the tire bead from the annular flanges of the rim by means of a specific beading tool, an operator positions and blocks the wheel on the apparatus for fastening and rotating.

Subsequently, the operator regulates the position of the operating head according to the specific dimensions of the wheel and moves the tool-carrier arm with respect to the supporting upright until the tool is positioned in correspondence to the side of the tire to be removed.

The tool is then moved towards the wheel and the terminal part of the tool presses on the side of the tire until it is introduced between the tire bead and the relative flange on the rim, until the hooked extremity of the tool is positioned so as to withhold the tire bead.

Subsequently, the tool is moved to remove a portion of the bead above the rim. The rotation of the rim then permits the removal of the entire bead from the respective flange.

Subsequently, the operator must unload the removed tire and load another tire, as well as unload the complete wheel once the new tire has been fitted.

During such operations, the tool-carrier arm would hinder tire or wheel unloading/loading and, in general, would hinder operator movements.

Consequently, the use is known of tool-carrier arm systems suitable for moving the tool-carrier arm itself away from the wheel.

In particular, tire-changing machines are known with means for tipping up the supporting upright, suitable for tilting the supporting upright behind the machine, so as to move the tool-carrier arm away from the wheel.

These movement systems of known type do however have a number of drawbacks.

The inclination of the supporting upright to free the work area of the tool-carrier arm in fact inevitably requires space being left at the rear of the machine to allow movement of the upright, thereby increasing the overall dimensions of the machine itself.

Movement systems of the tool-carrier arm with respect to the supporting upright are also known that allow moving the tool-carrier arm away from the wheel positioning it, e.g., at the side of the upright.

Such movement systems of known type are not without their drawbacks however.

In fact, such systems of known type generally affect the overall dimensions of the tire-changing machine.

Furthermore, considering that the tool-carrier arm is moved with respect to the supporting upright, the operator generally has to reposition the operating head according to the specific dimensions of the wheel every time he/she has to perform an operation involving the removal of the bead from the rim, even though such operation is repeated several times on wheels of the same dimensions.

This inevitably produces an increase in the time needed to remove or fit a tire.

SUMMARY OF THE INVENTION

The main aim of the present invention is to provide a machine for fitting and removing wheel tires for vehicles which allows to move the tool-carrier arm away from a wheel fitted on an apparatus for fastening and rotating without increasing the overall dimensions of the machine itself.

Another object of the present invention is to provide a machine for fitting and removing wheel tires for vehicles which allows to move the tool-carrier arm away from the apparatus for fastening and rotating of a wheel, when the latter is arranged in a particular work position set by the operator, and which allows, at the same time, to move again the tool-carrier arm near the apparatus for fastening and rotating, moving it in the same work position initially set by the operator.

Another object of the present invention is to provide a machine for fitting and removing wheel tires for vehicles which allows overcoming the mentioned drawbacks of the state of the art within the ambit of a simple, rational, easy and effective to use as well as low cost solution.

The above objects are achieved by the present machine for fitting and removing wheel tires for vehicles, comprising a bearing structure, at least an apparatus for fastening and rotating the rim of a wheel for vehicles, at least a tool-carrier unit associated mobile with said bearing structure and having at least a removal tool, at least an adjustment apparatus suitable for adjusting the position of said tool-carrier unit with respect to said bearing structure, to place said tool-carrier unit into at least a work configuration wherein said removal tool is arranged in proximity of said apparatus for fastening and rotating, at least a memorisation device for memorising the position of said tool-carrier unit in said work configuration and at least a positioning device for positioning said tool-carrier unit with respect to said bearing structure between said work configuration and at least a configuration of minimum overall dimensions, wherein said tool-carrier unit is arranged in proximity of said bearing structure.

BRIEF DESCRIPTION OF THE DRAWING FIGURES

Other characteristics and advantages of the present invention will become more evident from the description of a preferred, but not sole, embodiment of a machine for fitting and removing wheel tires for vehicles, illustrated purely as an example but not limited to the annexed drawings in which:

FIG. 1 is an axonometric view of the machine according to the invention;

FIGS. from 2 to 6 illustrate the operation of the machine according to the invention.

DETAILED DESCRIPTION OF THE INVENTION

With reference to such figures, globally indicated by 1 is a machine for fitting and removing wheel tires for vehicles.

The machine 1 can be used, e.g., inside garages or the like to carry out maintenance, repair or replacement jobs on vehicle wheel tires.

The machine 1 comprises a bearing structure 2.

With particular reference to the embodiment shown in the illustrations, the bearing structure 2 comprises a supporting bed 3 and an upright 4 which elevates vertically from the bed 3, in correspondence to a rear portion of the machine 1.

Different embodiments of the bearing structure 2 cannot however be ruled out. The machine 1 also comprises an apparatus for fastening and rotating the rim of a wheel A, indicated in the illustrations by the reference 5.

The apparatus for fastening and rotating 5 elevate vertically from the bed 3, in correspondence to a front portion of the machine 1 and may be composed, e.g., of a conventional rim locking spindle.

A tool-carrier unit 6 is associated mobile with the upright 4 and has a removal tool 7 of conventional type, usable to remove the wheel tire bead from the edge of the rim.

The machine 1 also comprises an adjustment apparatus for adjusting the position of the tool-carrier unit 6 with respect to the bearing structure 2, indicated altogether in the illustrations by the reference number 8.

The adjustment apparatus 8, in particular, allow positioning the tool-carrier unit 6 in a work configuration, wherein the tool-carrier unit 6 is substantially moved away from the upright 4 and the removal tool 7 is arranged in the proximity of the apparatus for fastening and rotating 5.

Figure 4:
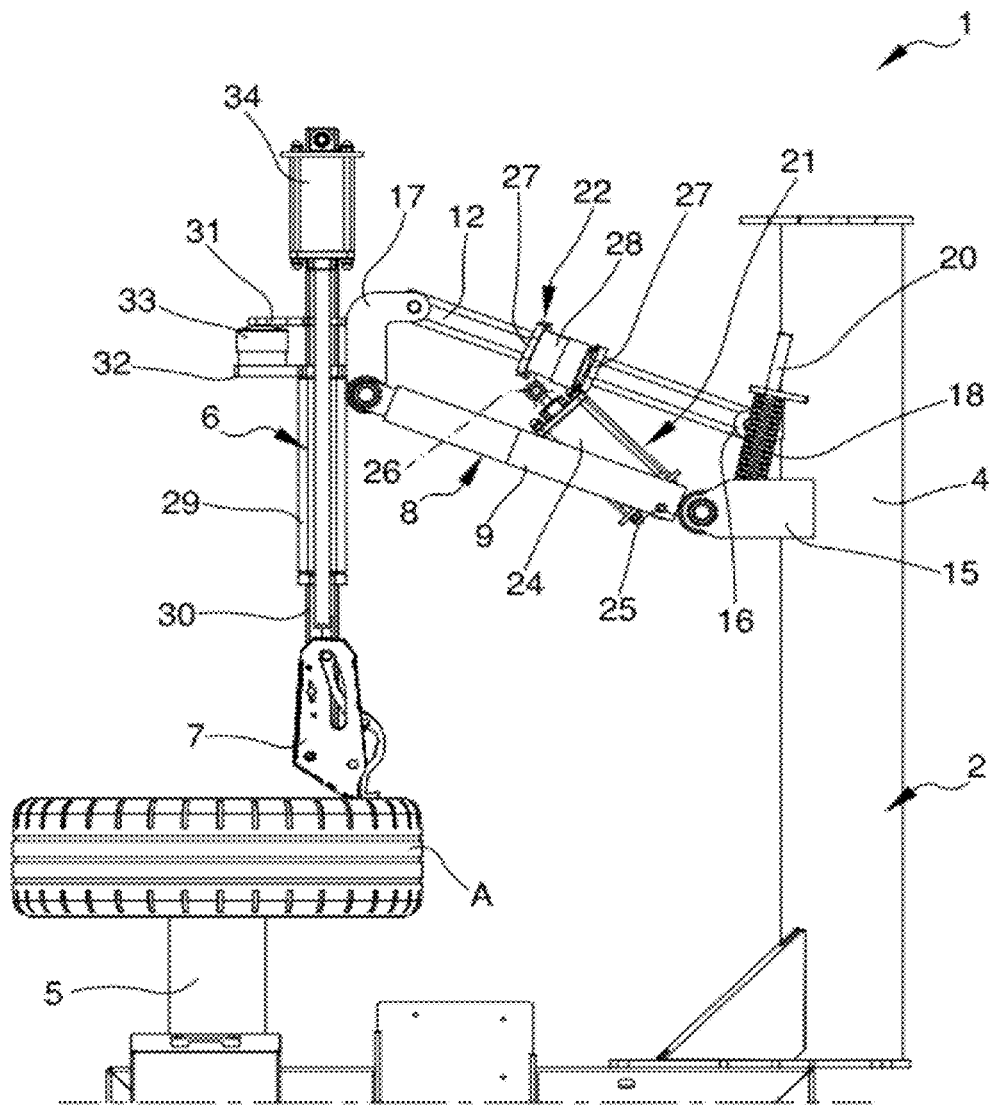

In the work configuration shown by way of example in FIG. 4, the removal tool 7 is suitably arranged in correspondence to the side of the tire of the wheel A in the proximity of the edge of the rim and, therefore, can be used to remove the tire bead from the rim.

In actual facts, the position of the tool-carrier unit 6 in the work configuration depends on the specific dimensions of the rim, meant as diameter and width, from which or on which the tire removal/fitting operation has to be performed. Consequently different dimensions of the rim and of the tire will correspond to different work positions.

Advantageously, with reference to the preferred embodiment of the machine 1 shown in the illustrations, the adjustment apparatus 8 is made up of an articulated quadrilateral mechanism placed between the upper portion of the upright 4 and the tool-carrier unit 6.

The articulated quadrilateral mechanism 8 comprises a pair of first rods 9 parallel with each other and having respective extremities associated revolving with the upright 4, in correspondence to a first hinging axis 10, and opposite extremities associated revolving with the tool-carrier unit 6, in correspondence to a second hinging axis 11.

Moreover, the articulated quadrilateral mechanism 8 comprises a second rod 12 having an extremity associated revolving with the upright 4, in correspondence to a third hinging axis 13, and an opposite extremity associated revolving with the tool-carrier unit 6, in correspondence to a fourth hinging axis 14.

In particular, the articulated quadrilateral mechanism 8 comprises a pair of first brackets 15 and a pair of second brackets 16 fastened to the upright 4.

Moreover, the articulated quadrilateral mechanism 8 comprises third brackets 17 fastened to the tool-carrier unit 6.

The first rods 9 are hinged to the first brackets 15, in correspondence to the first hinging axis 10, and to the third brackets 17, in correspondence to the second hinging axis 11.

The second rod 12 is hinged to the second brackets 16, in correspondence to the third hinging axis 13, and to the third brackets 17, in correspondence to the fourth hinging axis 14.

Preferably, the articulated quadrilateral mechanism 8 is of the articulated parallelogram type.

This consequently involves the sole translation of the tool-carrier unit 6, which, during its movement, always remains positioned in the same direction, preferably vertically, with the removal tool 7 correctly turned downwards. Different embodiments of the adjustment apparatus 8 cannot however be ruled out.

Usefully, the articulated quadrilateral mechanism 8 comprises a pair of thrust springs 18 suitable for applying on the respective appendices 19 of the first rods 9 enough thrust to keep the tool-carrier unit 6 in the position selected by the operator and preventing it from falling downwards.

The thrust springs 18 are supported by respective supporting elements 20 fastened to the upright 4.

The appendices 19 are made at the extremity of the first rods 9 in correspondence to the first brackets 15.

Figure 6:
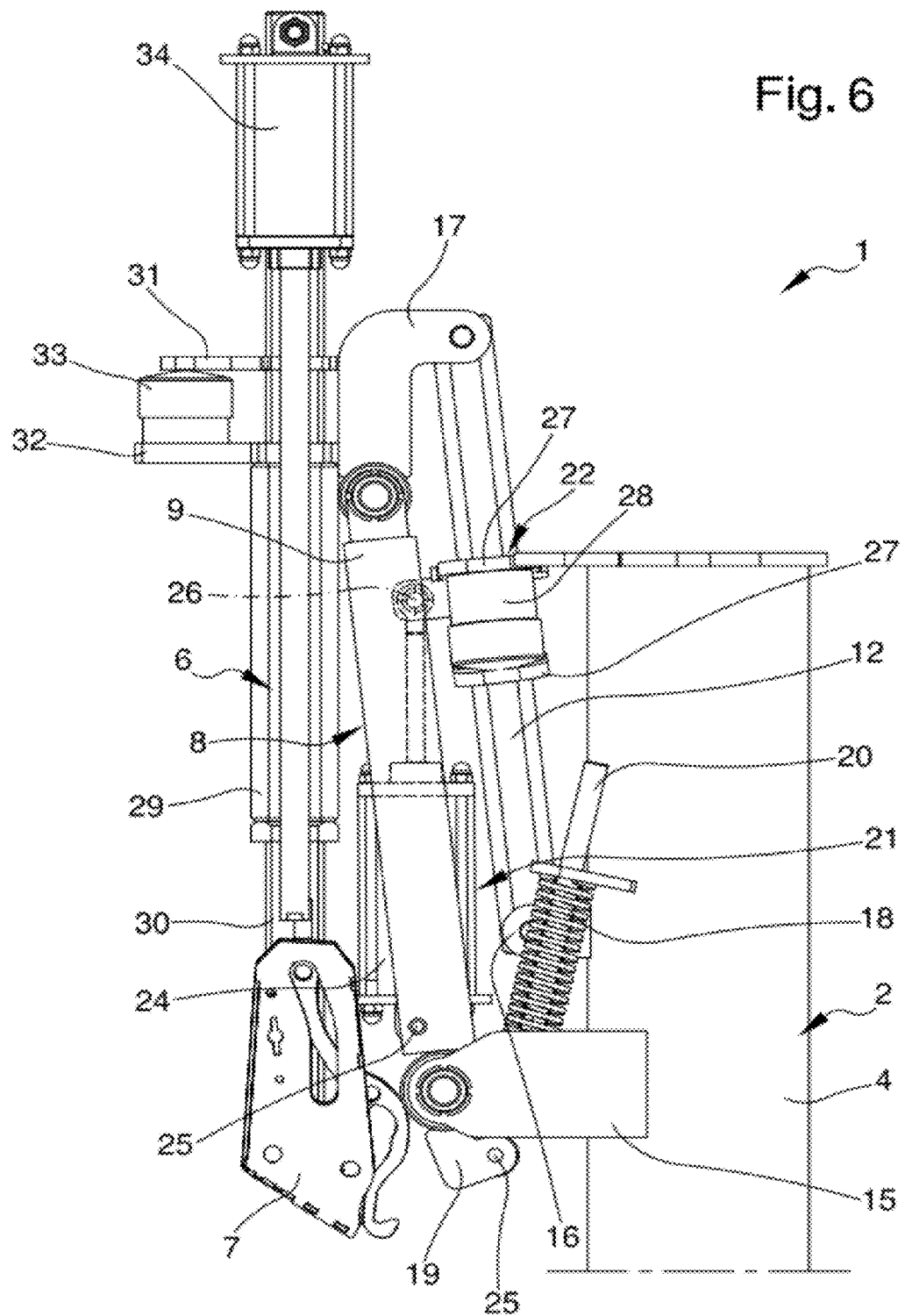

Advantageously, the machine 1 comprises a positioning device, indicated altogether in the illustrations with the reference 21, suitable for positioning the tool-carrier unit 6 with respect to the upright 4 between the aforementioned work configuration and a configuration of minimum overall dimensions shown by way of example in FIG. 6, wherein the tool-carrier unit 6 is arranged in the proximity of the upright 4.

In such configuration of minimum overall dimensions, the operator is free to operate on the wheel without the tool-carrier unit 6 hindering movements. Furthermore, in such configuration of minimum overall dimensions, the tool-carrier unit 6 is positioned in the proximity of the upright 4 and, therefore, does not affect the overall dimensions of the machine 1.

Advantageously, the machine 1 comprises a memorisation device 22 for memorising the position of the tool-carrier unit 6 in the work configuration.

With particular reference to the embodiment shown in the illustrations, the memorisation device 22 is composed of a locking/release device of the articulated quadrilateral mechanism 8 which is suitable for "memorising" the position of the tool-carrier unit 6 in the above mentioned work configuration.

In particular, the locking/release device is suitable for:
  locking the articulated quadrilateral mechanism 8 when the tool-carrier unit 6 is in the work configuration, i.e. substantially moved away from the upright 4 and with the removal tool 7 suitably arranged in the proximity of the tire to be removed, limiting the movement of the tool-carrier unit 6 between the work configuration and the configuration of minimum overall dimensions;
  releasing the articulated quadrilateral mechanism 8 to position the tool-carrier unit 6 in a different work configuration, when the removal or fitting of tires of wheels of different dimensions should be performed.

With particular reference to the preferred embodiment of the machine 1 shown in the illustrations, the positioning device 21 comprises a mobile element 23 associated sliding with the second rod 12.

In particular, the mobile element 23 comprises a bush with an opening in which is fitted a section of the second rod 12.

Usefully, the second rod 12 has a preferably hexagonal cross section and the opening of the mobile element 23 reproduces such hexagonal profile.

The positioning device 21 also comprises an actuator element 24, preferably made up of a linear actuator of the type of a fluid cylinder or the like.

In particular, the cylinder of the actuator element 24 has a first portion made up of the cylinder of the actuator element itself, hinged to the first rods 9 in correspondence to a first fulcrum 25.

Preferably, the first fulcrum 25 is in the proximity of the first hinging axis 10. The actuator element 24 has a second portion made up of the stem of the actuator element itself, hinged to the mobile element 23 in correspondence to a second fulcrum 26.

Different embodiments of the positioning device 21 cannot however be ruled out.

The positioning device 21, e.g., need not necessarily has an actuator suitable for moving the tool-carrier unit 6 in an automatic way between the work configuration and the configuration of minimum overall dimensions.

In case of the absence of an actuator therefore, the positioning of the tool-carrier unit 6 between the work configuration and the configuration of minimum overall dimensions can be done manually by an operator.

The locking/release device 22 of the articulated quadrilateral mechanism 8 comprises a pair of retention elements 27 suitable for locking the mobile element 23 on the second rod 12.

Preferably, the retention elements 27 are made up of a pair of plates arranged on opposite portions of the mobile element 23 and having respective transit holes for a section of the second rod 12.

The retention elements 27 are associated the one with the other and kept in position in correspondence to the opposite portions of the adjustable element by means of elastic elements, of the type of a return spring or the like, not shown in the illustrations.

Figure 2:
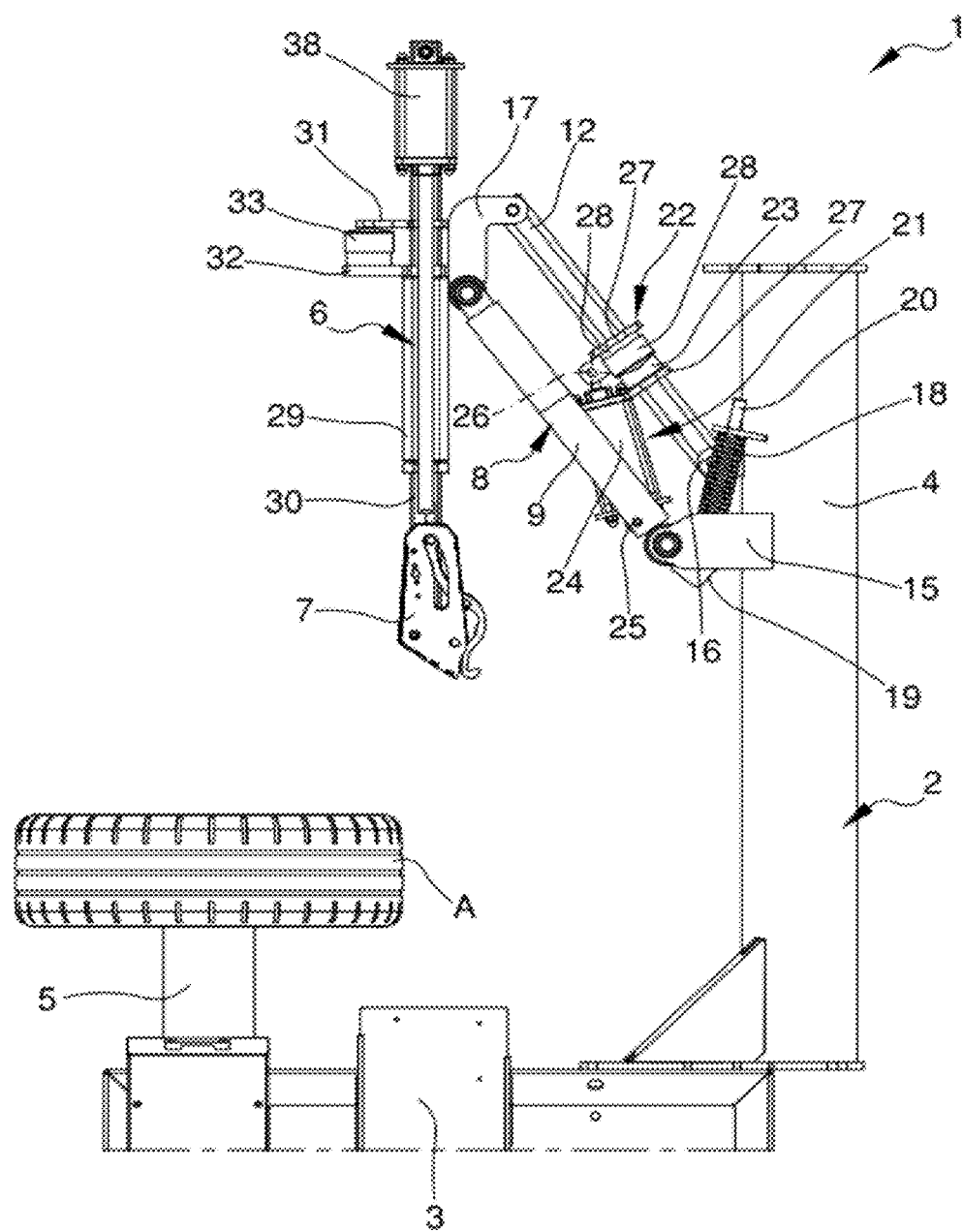
Figure 3:
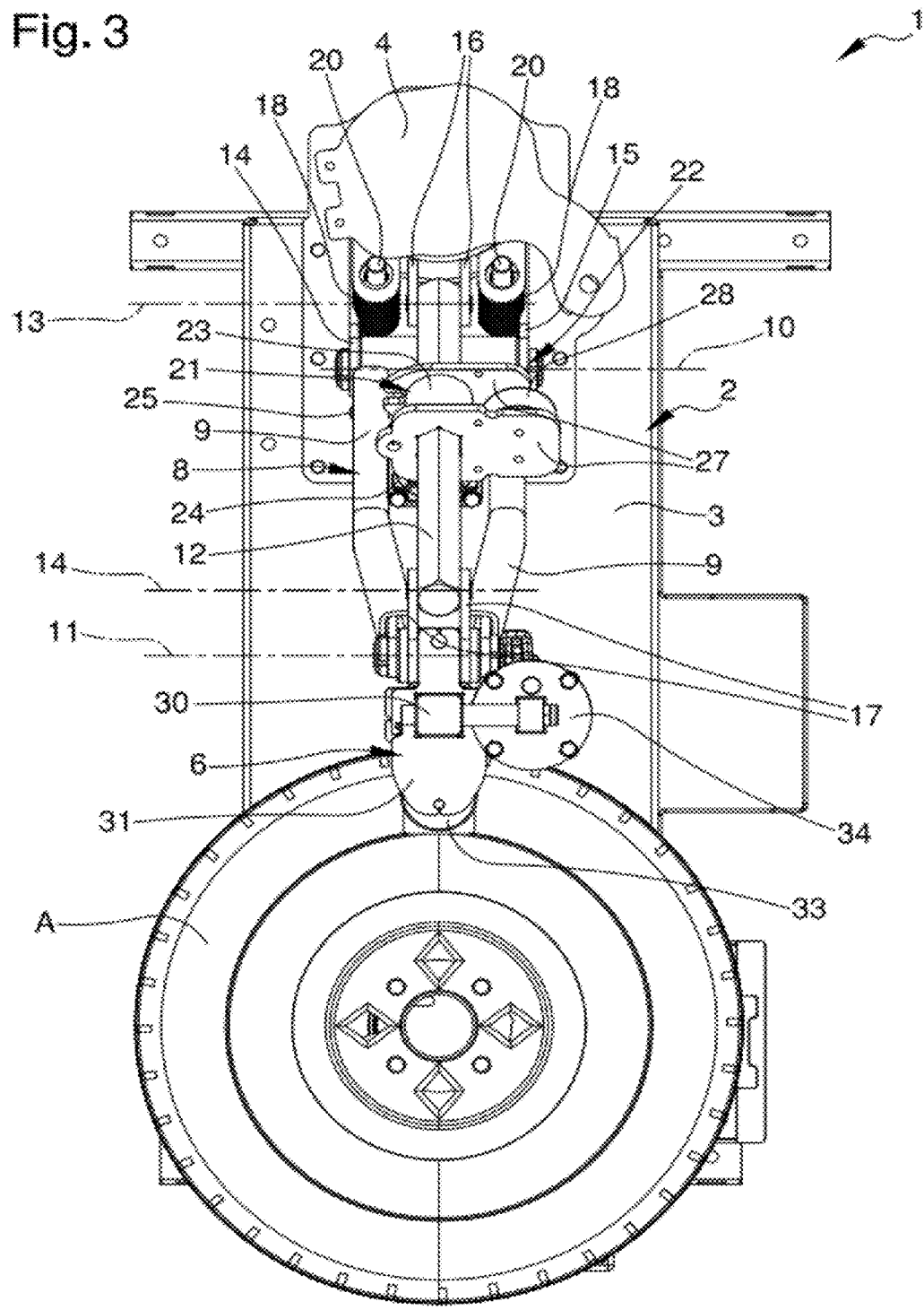
Figure 5:
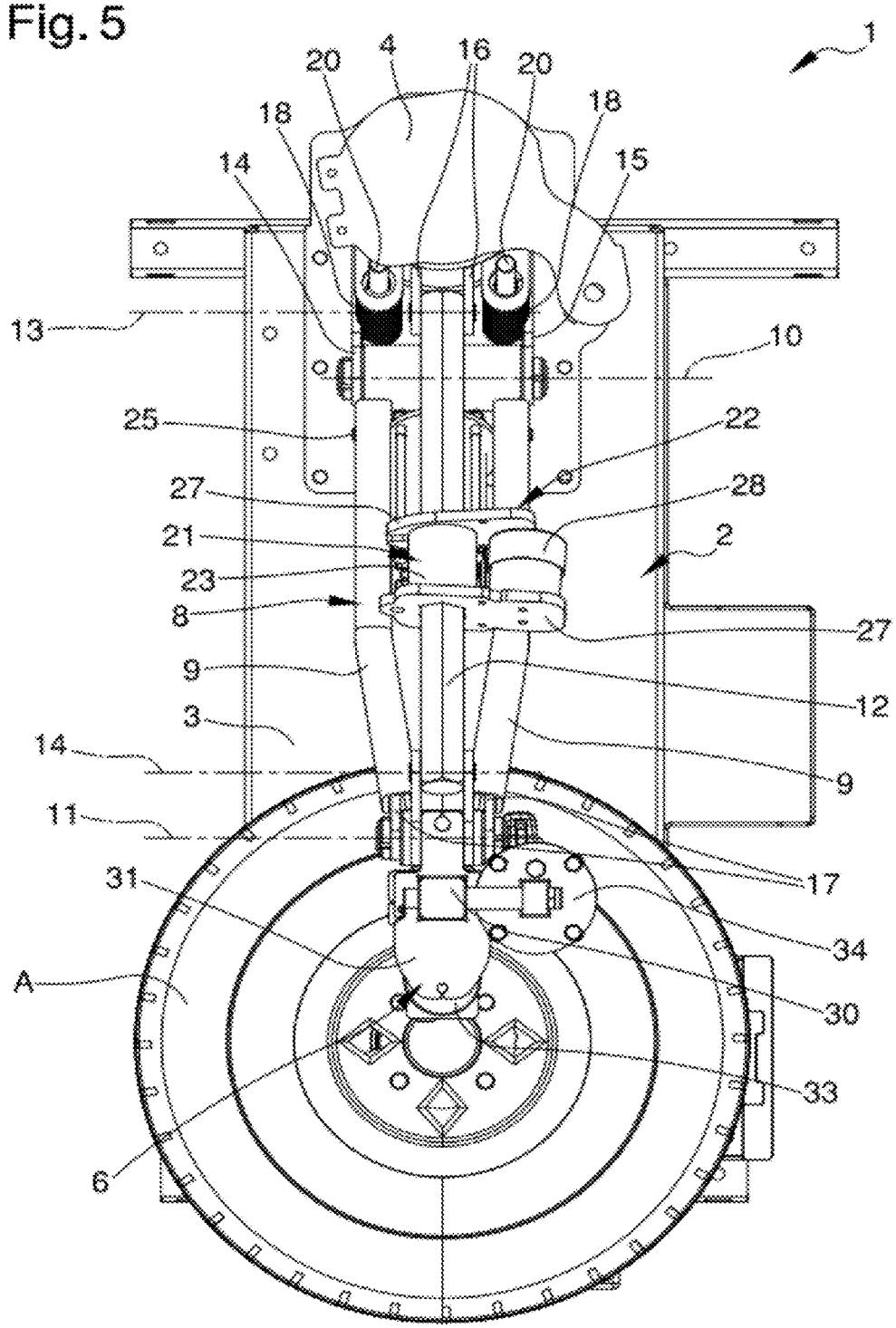

The retention elements 27 are mobile between the following positions:
- a sliding position, shown in the FIGS. 1, 2 and 3, wherein each retention element 27 is substantially at right angles to the second rod 12 and the hole of the retention element 27 is coupled with play to the second rod 12;
- a lock position, shown in the FIGS. 4, 5 and 6, wherein the hole of each of the retention elements 27 is substantially inclined with respect to the second rod 12 and the walls of the hole are engaged on the second rod 12.

The locking/release device 22 comprises an operation device 28 of the retention elements 27 between the above sliding and locking positions.

Preferably, the operation device 28 is made up of a fluid linear actuator or the like.

Usefully, the tool-carrier unit 6 comprises a bearing element 29 associated with the articulated quadrilateral mechanism 8 and an adjustable element 30 supporting the removal tool 7.

The adjustable element is associated mobile with the bearing element 29 along an approaching/moving away direction with respect to the apparatus for fastening and rotating 5.

In particular, the first rods 9 and the second rod 12 have the extremities opposite to the upright 4 hinged to the bearing element 29, in correspondence to the second hinging axis 11 and to the fourth hinging axis 14 respectively.

Preferably, the bearing element 29 is made up of a tubular element and the adjustable element 30 is made up of a rod fitted sliding inside the tubular element 29.

Preferably, the tubular element 29 and the rod 30 are arranged vertically.

The tool-carrier unit 6 comprises an additional retention element 31 suitable for locking/releasing the sliding of the rod 30 inside the tubular element 29.

The additional retention element 31 is composed of a plate associated with a support bush 32 and having a transit hole for a section of the rod 30.

The additional retention element 31 is mobile between the following positions:
- a sliding position wherein the additional retention element 31 is substantially at right angles to the rod 30 and the hole is coupled with play to the rod 30;
- a locking position wherein the hole of the additional retention element 31 is substantially inclined with respect to the rod 30 and the walls of the hole are engaged on the rod 30.

The tool-carrier unit 6 comprises an additional operation device 33 for moving the additional retention element 31 between the above sliding and locking positions.

Preferably, the additional operation device 33 is composed of a fluid linear actuator or the like.

The operation of machine 1 is described here below.

Following a preliminary phase of detachment of the tire bead from the annular flanges of the rim by means of a specific beading tool, an operator positions and fastens a wheel A on the apparatus for fastening and rotating 5 (FIG. 2). Subsequently, the operator adjusts the position of the tool-carrier unit 6 with respect to the upright 4 according to the specific dimensions of the wheel A, moving the removal tool 7 in correspondence to the side of the tire.

During such positioning, the actuator element 24 is not started and the stem of the actuator element 24 is retracted inside the cylinder, while the retention elements 27 are in the sliding position and the mobile element 23 is free to slide along the second rod 12, allowing the movement of the articulated quadrilateral mechanism 8 (FIGS. 2 and 3).

Once the removal tool 7 has been correctly positioned in correspondence to the side of the tire to be removed, the operator operates the operation device 28 which moves the retention elements 27 from the sliding position to the locking position (FIGS. 4 and 5).

The articulated quadrilateral mechanism 8 is then locked together with the tool-carrier unit 6 in the work configuration.

The removal tool 7 is then moved and the terminal part of the tool presses against the side of the tire and is fitted between the bead of the tire and the relevant flange on the rim, until the hooked extremity of the tool is positioned so as to withhold the tire bead.

Subsequently, the removal tool is positioned in the removal position so as to remove one portion of the bead above the rim.

The rotation of the rim then allows all the bead to come out of the respective flange.

Subsequently, to allow loading/unloading the tire on/from the rim or the complete wheel A on/from the apparatus for fastening and rotating 5, the intervention of the operator is required, either manual or with the aid of different tools.

During such operation, the tool-carrier unit 6 would hinder the movements of the operator.

Consequently, the operator starts the actuator element 24 which moves the articulated quadrilateral mechanism 8, moving the tool-carrier unit 6 from the work configuration to the configuration of minimum overall dimensions (FIG. 6).

Once the tire has been removed and/or once a new wheel has been fitted on the apparatus for fastening and rotating 5, the operator starts the actuator element 24 which moves the articulated quadrilateral mechanism 8, moving the tool-carrier unit 6 from the minimum overall dimension position to the work configuration (FIG. 4).

In the event of its being necessary to remove the tire of a new wheel A of the same dimensions as the previous wheel, in such work configuration, the removal tool 7 is already correctly arranged in correspondence to the side of the tire to be removed.

It has in fact been ascertained how the described invention achieves the intended objects.

In particular, the fact is underlined that the machine according to the invention has a positioning device which allow moving the tool-carrier unit away from the apparatus for fastening and rotating the wheel without increasing the total overall dimensions of the machine itself.

Furthermore, the machine positioning device according to the invention allows moving the tool-carrier unit nearer to the apparatus for fastening and rotating the wheel, returning it to the work configuration initially set by the operator.

This allows cutting the total time required to perform the tire removal/fitting operations, in particular if such operations are repeated several times on wheels of the same dimensions.

The invention claimed is:

1. Machine for fitting and removing wheel tires for vehicles, comprising a bearing structure, at least an apparatus for fastening and rotating the rim of a wheel for vehicles, at least a tool-carrier unit associated mobile with said bearing structure and having at least a removal tool, at least an adjustment apparatus suitable for adjusting the position of said tool-carrier unit with respect to said bearing structure, to place said tool-carrier unit into at least a work configuration wherein said removal tool is arranged in proximity of said apparatus for fastening and rotating, at least a memorization device for memorizing the position of said tool-carrier unit in said work configuration and at least a positioning device for positioning said tool-carrier unit with respect to said bearing structure between said work configuration and at least a configuration of minimum overall dimensions, wherein said tool-carrier unit is arranged in proximity of said bearing structure, wherein said memorization device comprises at least a locking/release device of said adjustment apparatus, suitable for locking said adjustment apparatus when said tool-carrier unit is in said work configuration, limiting the movement of said tool-carrier unit between said work configuration and said configuration of minimum overall dimensions, and suitable for releasing said adjustment apparatus to position said tool-carrier unit in a different work configuration, and wherein said adjustment apparatus comprise at least an articulated quadrilateral mechanism associated with said bearing structure and with said tool-carrier unit.

2. Machine according to the claim 1, wherein said articulated quadrilateral mechanism comprises at least a first rod associated revolving with said bearing structure, in correspondence to a first hinging axis, and associated revolving with said tool-carrier unit, in correspondence to a second hinging axis.

3. Machine according to the claim 2, wherein said articulated quadrilateral mechanism comprises at least a second rod associated revolving with said bearing structure, in correspondence to a third hinging axis, and associated revolving with said tool-carrier unit, in correspondence to a fourth hinging axis (14).

4. Machine according to claim 3, wherein said positioning device comprises at least a mobile element associated sliding with at least a section of said articulated quadrilateral mechanism and at least an actuator element having a first portion associated with said articulated quadrilateral mechanism and a second portion, mobile with respect to said first portion, associated with said mobile element.

5. Machine according to claim 4, wherein said locking/release device of the adjustment apparatus comprise at least a retention element of said mobile element on said articulated quadrilateral mechanism.

6. Machine according to claim 5, wherein said first portion of the actuator element is associated revolving with said first rod.

7. Machine according to claim 6, wherein said mobile element is associated sliding with said second rod.

8. Machine according to claim 7, wherein said second portion of the actuator element is associated revolving with said mobile element.

9. Machine according to claim 8, wherein said retention element comprises at least a hole for a section of said second rod passing through, said retention element being mobile between a sliding position, wherein said hole is coupled to said second rod with play, and a locking position, wherein said hole is substantially inclined with respect to said second rod and the walls of said hole are engaged on said second rod.

10. Machine according to claim 9, wherein said locking/release device comprises at least an operation device suitable for moving said retention element between said sliding position and said locking position.

11. Machine according to claim 1, wherein said articulated quadrilateral mechanism is of the type of an articulated parallelogram.

12. Machine according to claim 1, wherein said positioning device is associated with at least a first section of said articulated quadrilateral mechanism and with at least one between a second section of said articulated quadrilateral mechanism and said bearing structure.

13. Machine according to claim 1, wherein said tool-carrier unit comprises at least a bearing element associated with said adjustment apparatus and at least an adjustable element for supporting said removal tool, said adjustable element being associated mobile with said bearing element along an approaching/moving away direction with respect to said apparatus for fastening and rotating.

14. Machine according to claim 13, wherein said tool-carrier unit comprises at least an additional retention element suitable for locking/releasing the sliding of said adjustable element with respect to said bearing element.

15. Machine according to claim 14, wherein said additional retention element is associated with said bearing element and comprises at least a hole for a section of said adjustable element passing through, said additional retention element being mobile between a sliding position, wherein said hole is coupled to said adjustable element with play, and a locking position, wherein said hole is substantially inclined with respect to said adjustable element and the walls of said hole are engaged on said adjustable element.

16. Machine according to claim 15, wherein said tool-carrier unit comprises at least an additional operation device for moving said additional retention element between said sliding position and said locking position.

* * * * *